United States Patent

Peterson

[11] 4,050,656
[45] Sept. 27, 1977

[54] EJECTOR RACK

[75] Inventor: Paul F. Peterson, Rancho Palos Verdes, Calif.

[73] Assignee: The United States of America as represented by the Secretary of the Air Force, Washington, D.C.

[21] Appl. No.: 687,283

[22] Filed: May 17, 1976

[51] Int. Cl.$^2$ .............................................. B64D 1/02
[52] U.S. Cl. .............................. 244/137 R; 89/1.5 B; 89/1.5 F; 89/1.5 G; 294/83 AE
[58] Field of Search .................. 244/137 R; 89/1.5 B, 89/1.5 F, 1.5 R, 1.5 G; 294/83 AE

[56] References Cited

U.S. PATENT DOCUMENTS

| 2,526,903 | 10/1950 | Ruppert | 89/1.5 B |
| 3,557,550 | 1/1971 | Legarra | 89/1.5 F |
| 3,954,233 | 5/1976 | Hasquenoph et al. | 89/1.5 G |

FOREIGN PATENT DOCUMENTS

| 1,058,997 | 2/1967 | United Kingdom | 244/137 R |

*Primary Examiner*—Trygve M. Blix
*Assistant Examiner*—Charles E. Frankfort
*Attorney, Agent, or Firm*—Joseph E. Rusz; Arsen Tashjian

[57] ABSTRACT

An ejector rack that is attachable to an aircraft and is for supporting and selectively releasing and/or ejecting a store that is carried internal of the aircraft, i.e., in a bomb bay. The store can be released from the ejector rack, and from the aircraft, in either of two ways, namely: by pushing on a manually operated release handle; or, by forced ejection, the only way used during flight of the aircraft. Forced ejection is achieved by sending an electrical impulse to either or both of two cartridges in the breech of the ejector rack, igniting the cartridge(s). Gas is generated thereby; and, the resultant pressure that is built up in a gas system in the rack provides force that acts upon an unlocking piston, causing the piston to move out of its "locked" position. In turn, the moving piston provides a force on a slide, rotating a latch that allows the main linkage bellcrank to rotate and thus to open two hooks which are holding the store, thereby releasing the suspended store. Concurrently, gas pressure is manifolded to two sway brace ejection piston cylinders, and the ejection pistons therein are forcefully extended, causing positive and forcible ejection of the store by the ejection pistons. Unlike prior art devices, this ejector rack incorporates: a fully automatic sway brace system; a counterbalance assembly with a counterweight that prevents vibration loads from causing the inadvertent release of the store from the rack; and, a safety lock that automatically closes and also latches the hook linkage when the lock is moved to the locked position.

6 Claims, 12 Drawing Figures

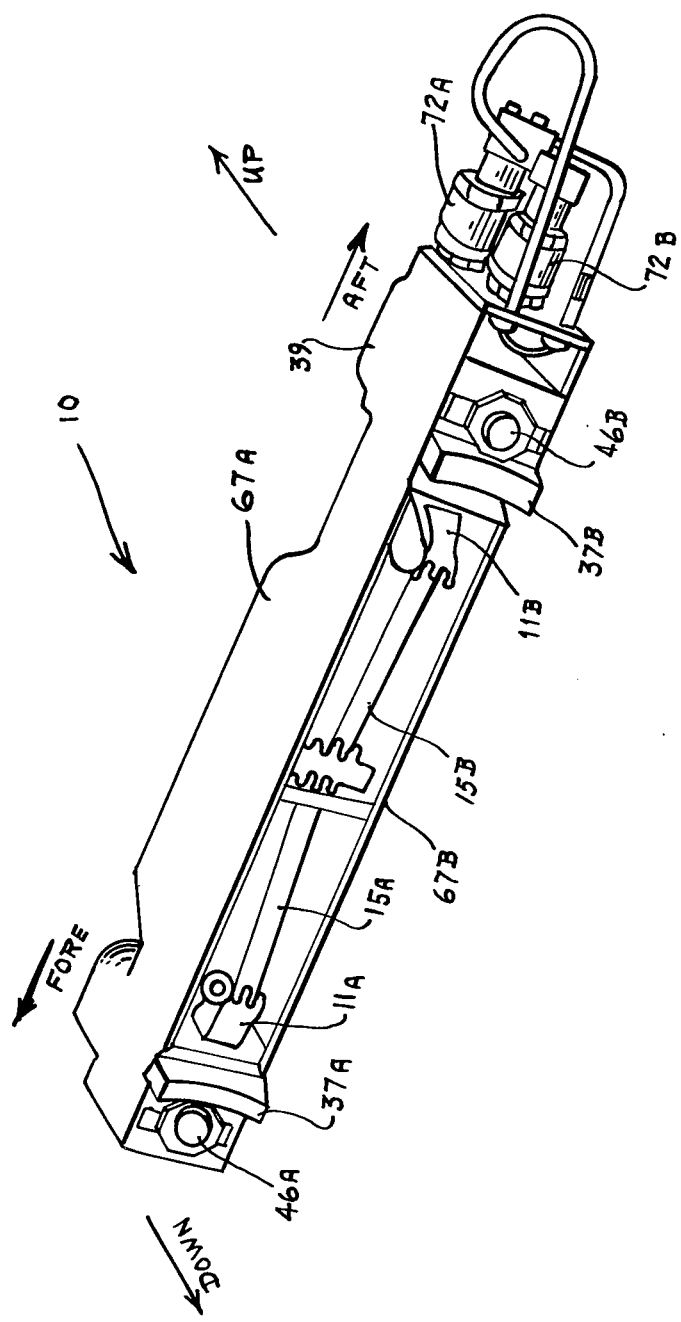

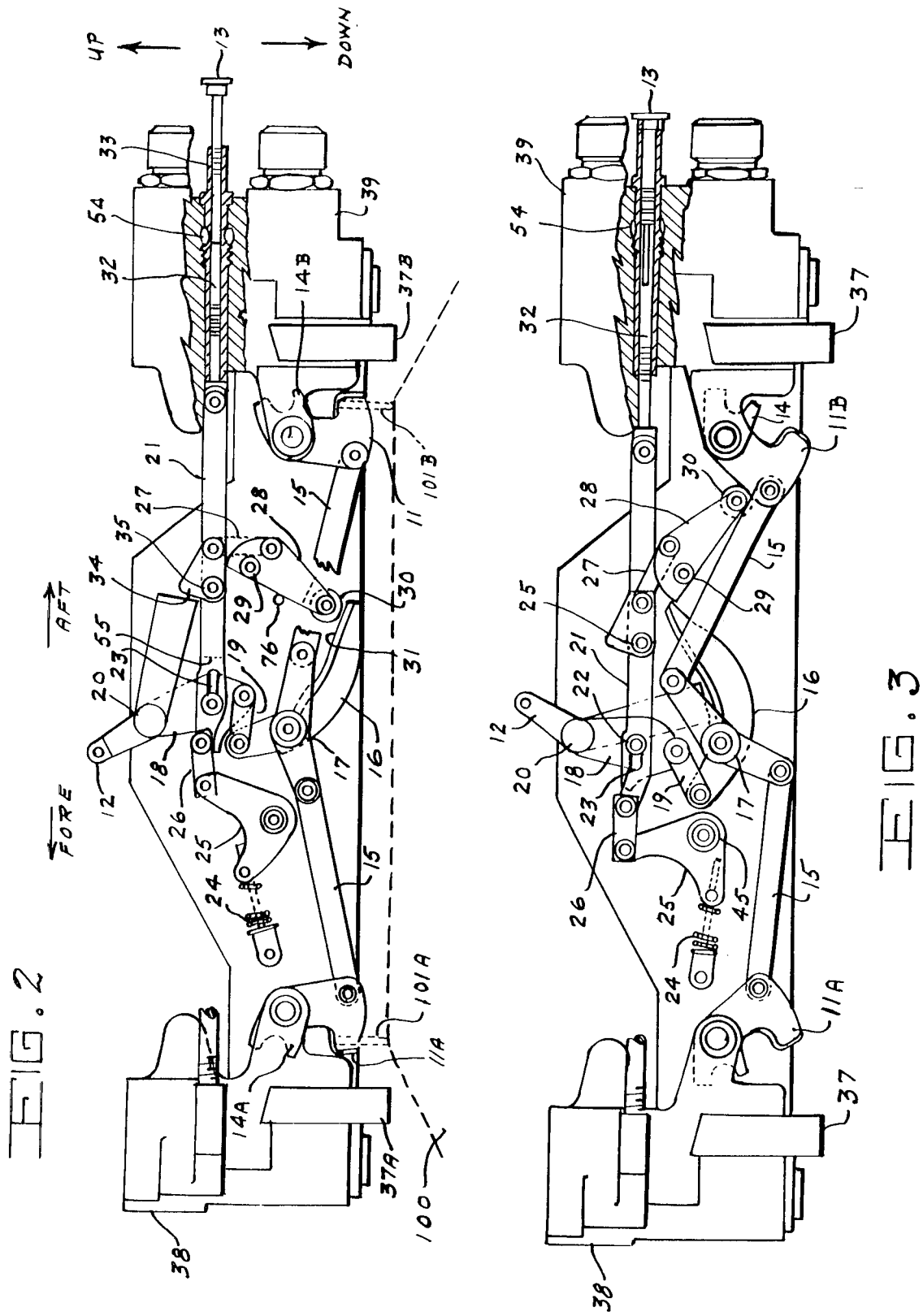

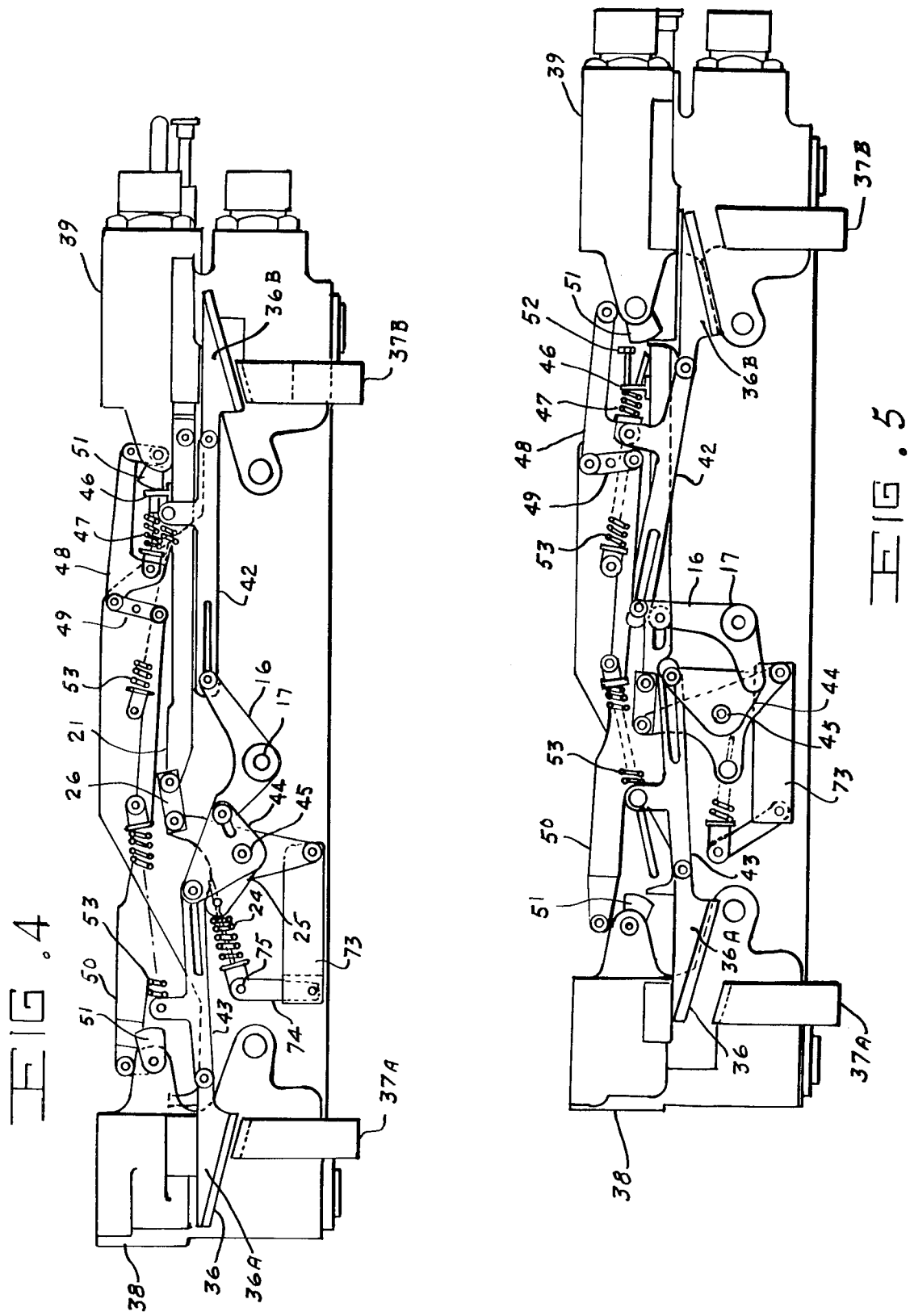

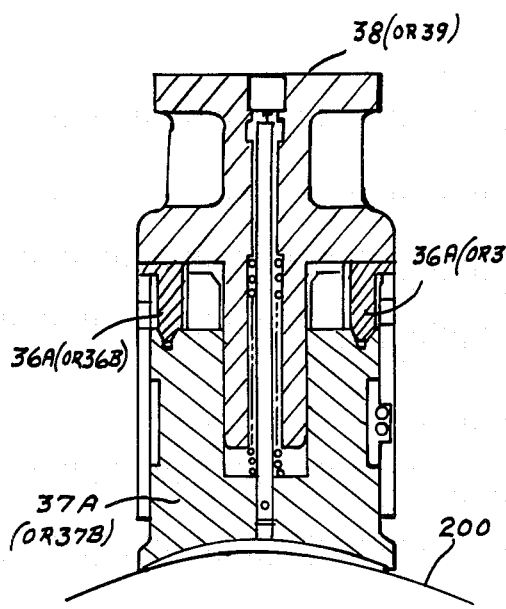
FIG. 6A
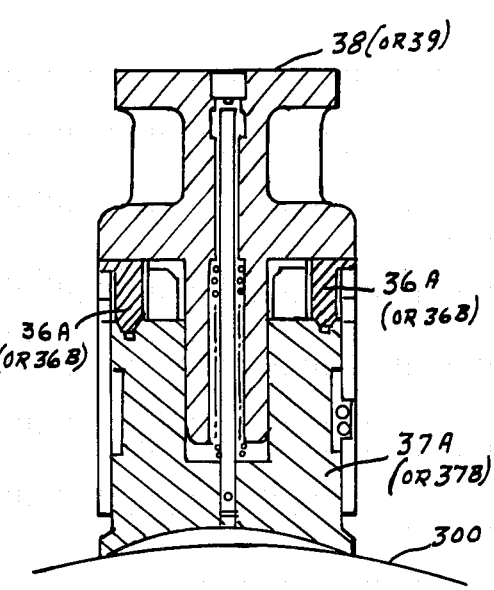
FIG. 6B
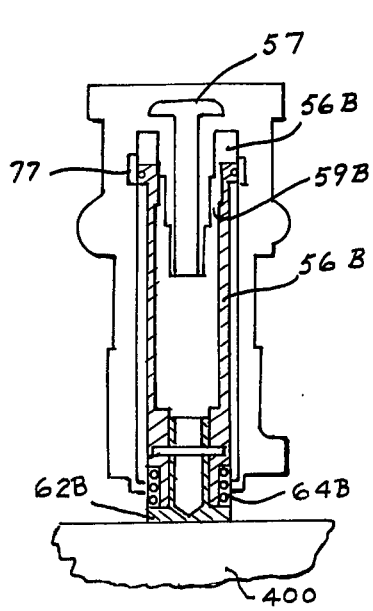
FIG. 8A
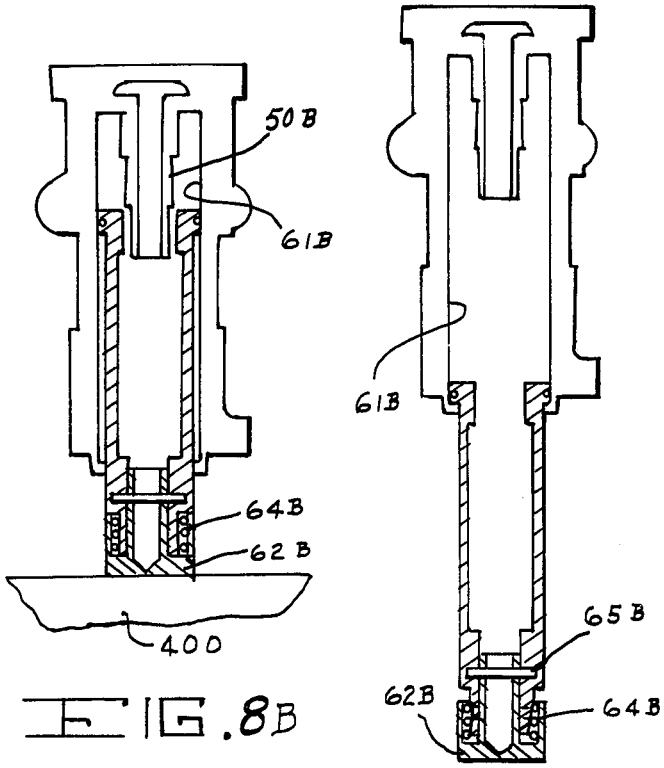
FIG. 8B
FIG. 8C

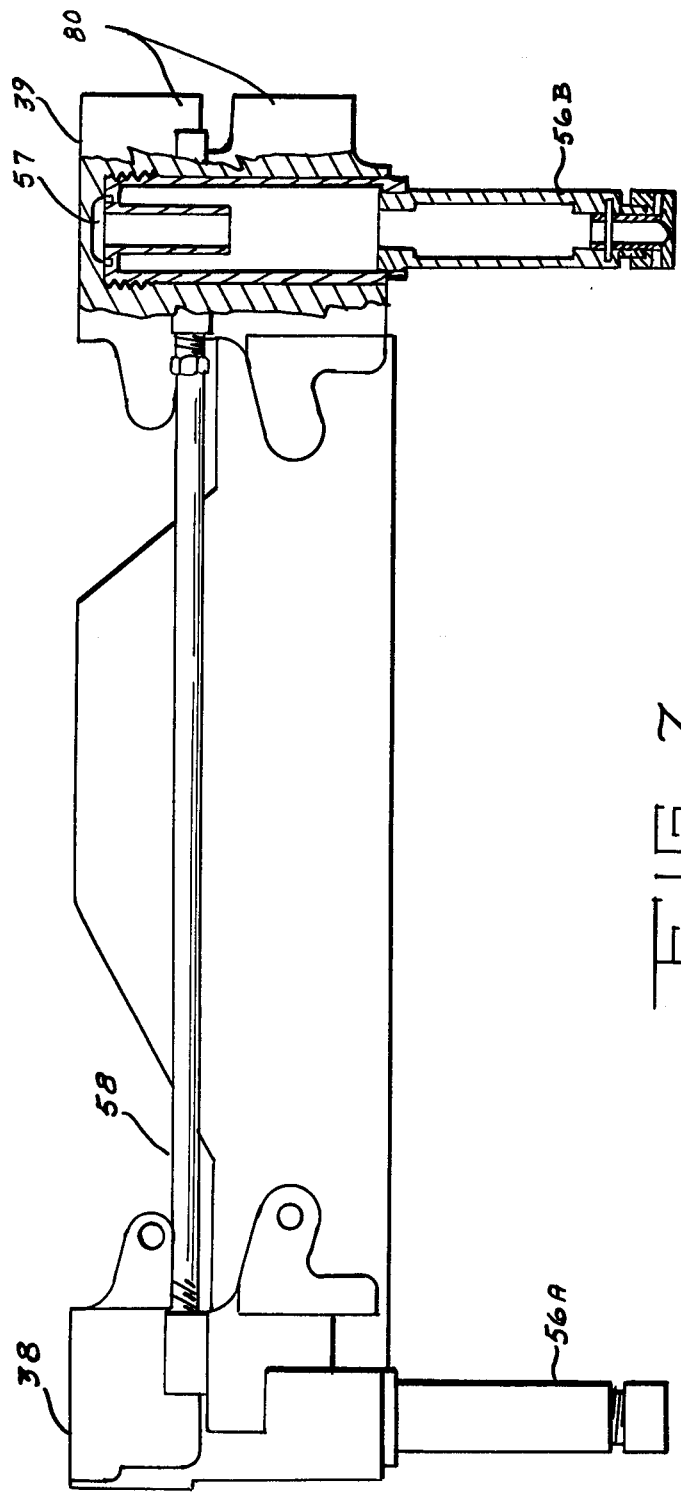

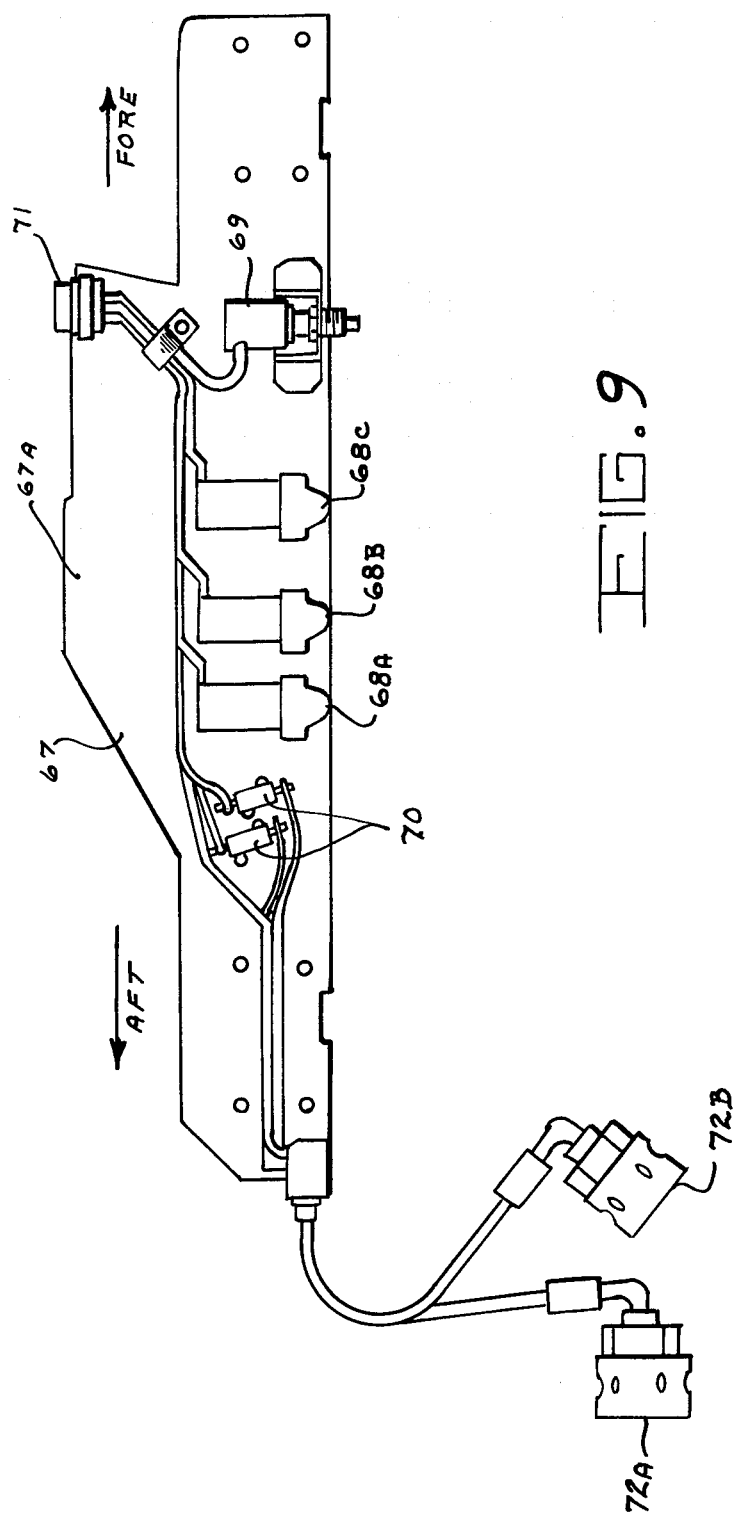

EJECTOR RACK

STATEMENT OF GOVERNMENT INTEREST

The invention described herein may be manufactured and used by or for the Government for governmental purposes without the payment of any royalty thereon.

BACKGROUND OF THE INVENTION

This invention relates to a suspension and release device and, more particularly, to a novel ejector rack for carrying a store (such as a conventional bomb, missile, tank, or the like) on and in an aircraft, whereby the suspended store may be released and/or forcibly ejected from the store and from the aircraft.

Ejector racks that are currently in inventory require access to sway braces and to the side plates of the rack for observing rack lock functions. Additionally, these racks also generally provide very high peak forces of short duration, while also providing low ejection velocities. Further, the sway braces of these racks need to be adjusted many times in close quarters, and when used externally, provide significant aerodynamic drag on the aircraft. Also, high vibration loads sometimes tend to effect inadvertent release of the store. Further, safety locking components or means usually require that the hook linkage be driven closed and that it be latched, before the safety lock can be applied.

My inventive ejector rack embodies a number of novel features which eliminate the above-described problems that are found in the prior art. These features of my inventive ejector rack include, but are not limited to, the following:

A fully automatic sway brace means located within the confines of the structure of the ejector rack. This means is cocked when the store is released, so that when the next store is installed, the sway braces are automatically driven to their respective locked position.

My novel ejector rack also incorporates mechanical gas control devices which are used to eliminate the high peak forces of short duration. The rack instead provides a lower peak force for a longer duration, which then effects greater separation velocities than those available in the prior art.

My rack provides a counterbalance assembly (that includes a counterweight) which prevents vibration loads from acting on the rack in a manner which would inadvertently release the store.

The safety lock assembly on my rack automatically closes and also latches the hook linkage as it is moved to the locked position.

Because of these novel and long-sought features, my invention ejector rack constitutes a significant advance in the state-of-the-art.

SUMMARY OF THE INVENTION

This invention relates to a novel ejector rack for releasably supporting, and for selectively releasing or forcibly ejecting, a store from an aircraft.

Accordingly, an object of this invention is to teach the structure of such an ejector rack and of a preferred embodiment thereof.

Another object of this invention is to provide a fully automatic sway back system (or means) for use in and with the ejector rack.

Still another object of this invention is to provide mechanical gas control means for use in and with the ejector rack, wherein said mechanical gas control means further provide, in turn, a lower peak force for a longer duration, which then effects greater separation velocities of the store from the rack than those velocities attainable with and by the use or prior art racks.

Yet another object of this invention is to provide locking component devices of the rack with a counterbalance assembly, including a counterweight, to prevent vibration loads from causing the inadvertent release of the store from the ejector rack.

Still yet another object of this invention is to provide a safety lock assembly for the ejector rack which automatically closes and also latches the hook linkage as the hook linkage is moved (rather than before it is completely moved) to the locked position.

These objects, as well as other related and equally important objects, of this invention will become readily apparent after a consideration of the description of my invention, coupled with reference to the Figures of the drawings.

DESCRIPTION OF THE DRAWINGS

FIG. 1 is a perspective view, in simplified form, of a preferred embodiment of the inventive ejector rack positioned on one of its sides, so that the bottom thereof may be seen;

FIG. 2 is a side elevation view, in simplified form, of the ejector rack, with one side plate (i.e., the left side plate) removed, showing the hook components of the rack in a closed position, such as they would be when supporting a store;

FIG. 3 is also a side elevation view, in simplified form, of the ejector rack, also with the left side plate removed, showing the hook components of the rack in an open position, such as they would be when not supporting a store;

FIGS. 4, 5, 6A and 6B are various views of the internal workings of the rack, principally showing the fully automatic sway brace means component of the rack, and in FIG. 4 the counterweight component of the means for preventing the inadvertent disengagement and release of a store due to the action of acceleration forces;

FIGS. 7, 8A, 8B and 8C are various views of the rack, simplified in the interest of maintaining clarity, principally showing those components that are primarily involved during forced ejection of a store from the rack; and, FIG. 9 shows the left side plate of the rack together with a preferred electrical assembly, attached thereto, for use with the rack.

DESCRIPTION OF, AND MANNER OF OPERATION OF, THE PREFERRED EMBODIMENT

It is here to be noted: that in FIGS 1–9, inclusive, the same means, components and the like have the same reference numerals, designations and the like throughout all of the Figures of the drawings; and, that, in the interest of brevity, a description of the preferred embodiment of my inventive ejector rack will be combined with a description of the manner of operation of the preferred embodiment.

In oversimplification, but succinctly, my inventive rack (and, of course the preferred embodiment thereof) may be said to comprise a plurality of interconnected and co-acting means and the like positioned within, and secured to, a means for attaching all of the means and the like to an aircraft, with said attaching means serving also as a housing for the other means.

Now, with reference to FIG. 1, therein is shown in perspective, and on one of its sides, a preferred embodiment 10 of my inventive ejector rack.

Easily seen are: two oppositely disposed hooks 11A and 11B; connecting links 15A and 15B interconnecting the hooks 11A and 11A and 11B; sway braces 37A and 37B; forward ejection piston 46A and aft ejection piston 46B; left (i.e., port) side plate 67A and right (i.e., starboard) side plate 67B; forward end block 38 and aft end block 39; and, upper firing pin assembly and igniter housing 72A and lower firing pin assembly and igniter housing 72B.

To better orient the reader, the directional designations "Fore", "Aft", "Up" and "Down" are shown, together with an arrow for each designation.

This view, which is a simplified overview of the preferred embodiment 10 of the inventive ejector rack, is presented in the interest of quickly acquainting the reader with the general structure of the preferred embodiment 10. It is here to be noted that, when the rack 10 is attached to an aircraft, it is attached by the "Up" side; and, as will be easily seen later herein, the rack 10 is ideal for submerged installations (i.e., internal of the aircraft).

With reference to FIGS. 2 and 3, these Figures clearly show the means, of the rack 10, for releasably supporting a store, such as 100, from its lugs, such as 101A and 101B.

More specifically, FIG. 2 shows the hooks 11A and 11B closed (i.e., in an upwardly position), as they would be when supporting a store, such as 100. In order to load a store 100, the linkage must be in the position shown in FIG. 3. This is accomplished by unlocking safety lock lever 12 and pushing forwardly the manually operated release handle (or knob) 13 at the aft end of the rack 10. A store can then be loaded to the rack simply by raising the store into position. As the lugs, such as 101A and 101B, of the store push against tangs 14A and 14B, their respective hooks 11A and 11B rotate upwardly and close. Connecting links 15A and 15B cause the main bellcrank 16 to rotate clockwise about its shaft 17. The bellcrank 16 is connected to an anvil 18 by link 19 which causes anvil 18 to rotate counterclockwise about shaft 20. It is here to be noted that safety lock lever 12 and anvil 18 rotate independently on and about shaft 20. It is also to be noted that safety lock 12 is configured essentially in the form of a "V" having two intersecting legs and a vertex, with the safety lock lever 12 pivotally attached to the attaching means, and with one of the legs of the lever 12 in removable contact with the interconnecting linkage.

Still with reference to FIGS. 2 and 3, the anvil 18 rides in a clevis (not shown) machined in the end of main slide 21. The anvil 18 also supports the end of slide 21 by means of pin 22 which is fixed to anvil 18 and rides in a clearance slot 23 machined in slide 21. The anvil 18 is in contact with the bottom of the clevis, so that its counterclockwise rotation causes slide 21 to move in the aft direction toward the breech at the aft end. This induced motion continues until bellcrank 16 and anvil 18 return to the position shown in FIG. 2. Motion of slide 21 beyond this point is induced by dual concentric springs 24 through bellcrank 25 and link 26. It is here to be noted that springs 24 and bellcrank 25 comprise a toggle mechanism. In FIG. 2, the springs 24 impart a clockwise movement to bellcrank 25 which through link 26 exerts force in the aft direction on the main slide 21. As will be later pointed out, this keeps the hooks 11A and 11B closed (i.e., upward). In FIG. 3, the springs 14 impart a counterclockwise movement to the same bellcrank 25 which, in a like manner, exerts force in the forward direction on the main slide 21. This holds the hooks 11A and 11B open (i.e., downward) to facilitate loading.

Link 27 attaches main slide 21 to latch 28 and causes it to rotate clockwise on and about shaft 29 as slide 21 moves aft. Continued motion of slide 21, after bellcrank 16 has seated, returns latch 28 to the position shown in FIG. 2. The end of latch 28 is equipped with a heavy duty needle bearing roller 30 to reduce unlatching friction loads. The latching face of bellcrank 31 is ground at an angle to impart a slight clockwise movement to latch 28. Further clockwise rotation of latch 28 is prevented by positive stop 76, such that an opening moment on the hooks 11A and 11B causes bellcrank 16 to drive latch 28 against its stop 76. Counterclockwise rotation of latch 28 is prevented by link 27 which is slightly past perpendicular with respect to main slide. 21.

The right end (i.e., aft end) of slide 21 is pinned to a clevis (not shown) machined on the end of actuator piston 32. A shoulder on piston 32 bottoms out against the gland 33 which stops aft motion of slide 21 and places piston 32 in the battery position (i.e., aft). The hooks 11A and 11B are closed and latched as long as slide 21 and piston 22 remain in battery.

Safety lock 12 acts directly on slide 21 at area 34, FIG. 2, to insure a safe condition for ground handling operations. With safety lock 12 in the locked position, FIG. 2, the hooks 11A and 11B are always closed (i.e., upward) and positively locked. Should the safety lock 12 be applied with the hooks 11A and 11B open (i.e., downward), they will be driven closed. It is here to be noted that, should inadvertent ignition of the propellant cartridges (not shown) occur, the safety lock assembly is adequately strong to prevent release of the store.

Closure of the hooks 11A and 11B by the safety lock 12 is effected in the following manner: A long arm on the safety lock 12 contacts a ball bearing roller 35 attached to the main slide 21, causing the slide 21 and piston 22 to return to battery (i.e., aft), as safety lock lever 12 is moved to the locked position (i.e., aft). As link 26 is pulled back by slide 21, it contacts a tang on anvil 18 which drives link 19, bellcrank 16, links 15A and 15B, and the hooks 11A and 11B closed. The tank on anvil 18 and link 26 are contoured to insure proper mating of roller 30 with surface 31 of bellcrank 16 during the hook closing cycle.

In summary, it may be said that my means component for releasably supporting a store, such as 100, FIG. 2, includes: two oppositely disposed hooks 11A and 11B configurated and dimensioned to accept and to removably engage the store 100 by its lugs 101A and 101B, with the hooks 11A and 11B at a preselected distance (preferably 14 inches) from each other; linkage (including but not limited to links 15A and 15B) disposed between, and interconnecting, the oppositely disposed hooks 11A and 11B, with these hooks being responsive simultaneously to movement of this interconnecting linkage; means, operatively associated with the interconnecting linkage, for moving the interconnecting linkage (which said means will be more fully shown and described later herein) to effect simultaneous movement of the hooks 11A and 11B upwardly to close the hooks (and, thereby to removeably engage the store 100 and the store lugs 101A and 101B and the store 100 from the hooks), or downwardly to open the hooks (and, thereby to disengage and to release the store lugs 101A and 101B and the store 100 from the hooks); and, means operatively associated with the interconnecting linkage and with the means for moving the interconnecting linkage, for preventing movement of the interconnecting linkage and of the linkage moving means, with this linkage movement prevention means including, but not limited to, safety lock lever 12 and ball bearing roller 35 attached to main slide 21.

The component means (of the releasably support means) which has not been described, but which will be shown and described in detail later, is a means for preventing acceleration forces from acting on the linkage moving means and inadvertently causing the disengagement and the release of the store.

With reference to FIGS. 4, 5, 6A and 6B, these Figures clearly show my fully automatic sway brace system which is a component of my interconnecting linkage moving means which, in turn, is a component means of my ejector rack 10.

At the end of the hook closing cycle (previously described herein), transversely movable, spring-loaded wedges 36A and 36B, which are components of my sway brace system, are released to seat (i.e., to make frictional contact with) the upwardly and downwardly movable automatic sway braces 37A and 37B against the store 100. FIGS. 6A and 6B are typical cross sections through the sway braces 37A and 37B, showing how each sway brace is secured to its respective end block, such as forward end block 38 and aft end block 39; and, how each sway brace is seated by its respective wedge over a wide range of vertical positions. The diameter of the respective store, such as 200, FIGS. 6A, and 300, FIG. 6B, has a slight effect on the vertical location of its sway brace 38 or 39 which is readily accomodated by the particular wedge 36A or 36B involved.

FIG. 4 shows the wedges 36A and 36B in the fully extended position (i.e., outward) with the sway braces 37A and 37B fully down (i.e., no store loaded to the rack 10). With a store loaded to the rack 10, the sway braces 37A and 37B would be raised by the surface of the store and the wedges 36A and 36B would extend (i.e., moved outward) only to where good contact is made with the tops of the sway braces 37A and 37B.

The operation of the sway brace system, which includes the wedges 36A and 36B, can best be described with the hook opening cycle:

As the hooks 11A and 11B open, counterclockwise rotation of the main bellcrank 16 retracts the wedges 36A and 36B to the position shown in FIG. 5 by means of links 42 and 43w and bellcrank 44. In this regard, it is to be noted that bellcrank 44 shares shaft 45 with bellcrank 25, but each of these bellcranks is independent of the other.

As the slide 21 is driven forward, a fitting 36 attached to the slide 21 contacts a spring 47 and drives links 48, 49 and 50, causing two wedge locks 51A and 51B to be held spring-loaded in the downward position, as shown in FIG. 5. As the wedges 36A and 36B are concurrently pulled back (i.e., retracted), a tang on top of each wedge 36A and 36B slides past its corresponding lock, to fall in place behind (i.e., outward of) the tank, which effectively locks each wedge 36A and 36B in the retracted position.

When a store is loaded to the rack 10, the main slide 21 is driven aft as described previously. In the final increment of travel, just before slide 21 and piston 32 reach battery (i.e., aft), fitting 46 contacts a nut 52 which raises the wedge locks 51A and 51B by means of links 48, 49 and 50, releasing the wedges 36A and 36B. At this point the store is in place, the hooks 11A and 11B are closed, and the latch 28 is in position behind bellcrank 16, securing the hooks 11A and 11B closed (i.e., upward). The released wedges 36A and 36B are then driven by springs 53 to seat between sway braces 37A and 37B and supporting surfaces of the end blocks 38 and 39, thus sway-bracing the store automatically.

Now, with reference to FIGS. 7, 8A, 8B and 8C, these Figures show my means for selectively ejecting the store forcibly from my rack 10, with said ejection means being of course a component of my ejector rack.

With two conventional electrically initiatable (i.e., ignitable) cartridges (not shown) installed in the breech 80, the rack 10 is ready for operation. An electrical impulse ignites the cartridges, generating a high pressure gas. An interconnecting passage (not shown) provides for sympathetic ignition, if one cartridge fails to initiate electrically. Some of this gas is delivered to the actuator piston 32, FIGS. 2 and 3, through element 54, FIGS. 2 and 3, which causes the piston 32 and slide 21 to move forward. Link 27, FIGS. 2 and 3, causes latch 28, FIG. 2, to rotate counterclockwise, unlatching main bellcrank 16, FIGS. 2 and 3. As the slide 21 and the piston 22 continue to move forward, the bottom of the clevis 55, FIG. 2, contacts the anvil 18, causing it to rotate clockwise about its shaft 10, FIG. 2. By means of link 19, the main bellcrank 16 is made to rotate counterclockwise about its shaft 17, FIG. 3, retracting interconnecting links 15A and 15B, FIG. 3, which open the hooks 11A and 11B, FIG. 3. It is here to be noted that concurrently the wedges 36A and 36B, FIG. 5, have retracted and locked, as previously described.

With the hooks 11A and 11B open, forced ejection is effected by forward ejection piston 56A and aft ejection piston 56B, FIG. 7, which are located respectively in forward end block 38 and aft end block 39. In FIG. 7 the ejection means is shown with the ejection pistons 56A and 56B fully extended. Aft end block 39, which contains the breech 80, delivers propellant gas to its aft ejection piston 56B at port 57. Propellant gas is delivered to a similar port in the forward ejection piston 56A by means of a gas tube 58 and internal passages in both end blocks 38 and 39. FIG. 8 shows the operation of aft ejector piston 56B (which operation is the same as that of forward ejector piston 56A) in three stages (i.e., in FIGS. 8A, 8B and 8C). Initially, the gas pressure is relatively high, but the effective piston area is small (i.e., approximately the inside diameter of piston 56B at location designated 59, FIG. 8A). As the piston 56B starts to move downward, the increase in volume in the cylinder 66 tends to reduce the pressure. In order to compensate for this pressure reduction, a probe 60B, FIG. 8B, allows the gas to act on the top of the piston 56B, after a predetermined amount of piston travel, which increases the effective piston area (i.e., to the diameter of the bore 61, FIG. 8B). This pressure control decreases the initial peak force and, more importantly, sustains a high working force for the duration of the stroke. The result is that, for a given stroke, more energy is delivered to the store and, hence, higher ejection velocities are imparted to the store. The foot 62B of the piston 56B is held in contact with the store 400 at all times prior to ejection by a spring 64B, FIGS. 8B and 8C. A pin 65B, FIG. 8C, retains the foot 62B when a store, such as 400, is not in place. Short bypass slots, designated 77, FIG. 8A, are provided at the top of cylinder 66B to bleed off gas, in the event of an inadvertent firing with the rack 10 closed (i.e., hooks 11A and 11B in an upward position and lock 12 in a locked position, FIG. 2). When this condition occurs, gas from the piston cavity will bleed around the probe 60B to the head of the piston 56B, through the bypass slots 77, and emerge from the bottom of the cylinder 66B around the foot 62B. The bypass slots 77 have little effect on performance since, in normal operation, the head of the piston 56B clears the slots 77 before the probe 60B allows any significant amount of gas to reach that area.

Now, returning to FIG. 5, therein is shown the component means of the releasable (store) support means (described hereinbefore and shown in FIGS. 2 and 3) which was not previously described in detail.

More specifically, and with reference to FIG. 5, said component means is a means for preventing acceleration forces from acting on the linkage moving means and inadvertently causing the disengagement and release of the supported store, wherein said inadvertent release prevention means includes a counterbalance assembly that further includes a counterweight 73, FIG. 5.

Basically, in order to provide a securely latched and supported store during flight of the aircraft, and when the (ground) safety lock 12 is in the unlocked position, the counterweight 73, together with other components, is provided to cancel the effect of "G" forces. It has already been pointed out that the hook linkage, including interconnecting links 15A and 15B, is positively latched, as long as the main slide 21 and actuator piston 32 are in battery (i.e., the aft position). It also has already been pointed out that this condition was maintained by the dual concentric springs 24 acting on bellcrank 25 and link 26 which is attached to slide 21. Referring temporarily to FIG. 4, it can be seen that bellcrank 25 has a third arm from which is suspended a counterweight 73 from one of its ends. The other end of the counterweight is supported by link 74 which pivots at shaft 75. FIG. 5 shows the counterweight 73 in its travelled position. The piston 32, the knob 13, slide 21, link 25, bellcrank 25, link 74, and counterweight 73 are shaped to that, with acceleration of the rack 10 in the fore and/or aft direction, the sum of the moments about shaft 45, FIGS. 4 and 5, due to acceleration forces of all the related components, is zero. "G" forces resulting from vibration or shock loads, therefore, will not exert unlatching forces on this means.

With reference to FIG. 9, therein is shown in a pictorial representation a preferred electrical assembly for use with my ejector rack 10. To assist the reader, the left side plate 67A has been turned outwardly to show the internal surface thereof, so that the reader is cautioned to be aware of and to heed the "Fore" and "Aft" designations and directional arrows that are shown in FIG. 9.

The entire electrical assembly is mounted to the internal surface of the left side plate 67A, which said side plate (with the electrical assembly mounted thereon) is easily removable, for repair or replacement of the electrical assembly or any components thereof. The assembly includes three standard arming solenoids 68A, 68B and 68C for lanyard control of store fuzing, a store-sensing switch 69, two resistors 70A and 70B, a receptacle 71 for connecting to the aircraft electrical system, and two firing pin assemblies 72A and 72B which secure the propellant cartridges in the breech and provide the electrical initiation circuit.

As has been stated previously herein when discussing the selective forcible ejecting means (see FIGS. 8A, 8B and 8C and description relative thereto), an electrical impulse generated by this electrical assembly ignites the propellant gas cartridges housed in the firing pin assemblies and igniter housings 72A and 72B and secured thereby in the breech. A high pressure gas is generated as a result; and, in due course, this gas causes the opening (i.e., downward rotation) of hooks 11A and 11B and, concurrently, the forceful extension of the sway brace ejection pistons, causing positive and forcible ejection of the store.

CONCLUSION

It is abundantly clear from all of the foregoing, and from the many Figures of the drawings herein, that the stated and desired objects of my invention have been attained. In addition, related desired objects also have been achieved. For example, the breech 80 and all controls required for normal operation are readily accessible from the aft end of the rack 10, making the rack ideal for submerged installations where side plates of prior art ejector racks are not readily accessible, if they are accessible at all.

It is to be noted that, although there have been described the fundamental and unique features of my invention ejector rack as applied to a particular preferred embodiment, various other embodiments, adaptations, substitutions, additions, and omissions, and the like will occur to, and can be made by, those of ordinary skill in the art, without departing from the spirit of my invention.

What is claimed is:

1. An ejector rack for releasably supporting, and selectively ejecting forcibly, a store from an aircraft, wherein said store has a plurality of lugs from which said store is removably engaged with and to said ejector rack, comprising:
    a. means for releasably supporting said removably engaged store by said store lugs, wherein said means for releasably supporting said store includes:
        1. two oppositely disposed hooks configurated and dimensioned to accept and to removably engage said store by said store lugs, with said hooks at a preselected distance from each other;
        2. suitably dimensioned and configurated linkage disposed between, and interconnecting, said oppositely disposed hooks, whereby said hooks are responsive simultaneously to any movement of said interconnecting linkage;
        3. means, connected to said interconnecting linkage, for moving the interconnecting linkage to effect simultaneous movement of said hooks upwardly to close said hooks and thereby to removably engage said store and said store lugs by said hooks, and also to effect simultaneous movement of said hooks downwardly to open said hooks and thereby to disengage and to release said store lugs and said store from said hooks, wherein said interconnecting linkage moving means includes a selectively useable manually operated release handle;
        4. means, connected to said interconnecting linkage for selectively preventing any movement of said interconnecting linkage, wherein said interconnecting linkage movement prevention means includes a manually operated safety lock assembly;
5. and, means, connected to said interconnecting linkage moving means, for preventing acceleration forces from acting on said interconnecting linkage moving means and inadvertently causing said interconnecting linkage moving means to move said interconnecting linkage to open said hooks and thereby to disengage and to release said store lugs and said store from said hooks, wherein said inadvertent release prevention means includes a counterbalance assembly;

b. means for selectively ejecting said store forcibly, with said ejection means operatively associated with said support means;

c. and, means for attaching said support means and said ejection means to said aircraft.

2. An ejector rack, as set forth in claim 1, wherein said two hooks are at a distance of 14 inches from each other.

3. An ejector rack, as set forth in claim 1, wherein said interconnecting linkage moving means further includes:
a. a main slide operatively associated with said manually operated release handle;
b. an anvil slideably pinned to said main slide, pivoted at one end to said attaching means, and pivotally connected at another end to a link;
c. and, a main bellcrank pivotally connected at an end to said link and also pivotally connected to said interconnecting linkage;
whereby, when said selectively useable manually operated release handle is moved forwardly, said hooks move downwardly and open, and when said release handle is moved aft, said hooks move upwardly and close.

4. An ejector rack, as set forth in claim 1, wherein said safety lock assembly of said interconnecting linkage movement prevention means includes a movable safety lock lever configurated essentially in the form of a "V" having two intersecting legs and a vertex, with said safety lock lever pivotally attached to said attaching means, and with one of said legs of said safety lock lever in removable contact with said interconnecting linkage.

5. An ejector rack, as set forth in claim 1, wherein said counterbalance assembly of said inadvertent release prevention means includes:
a. a counterweight having two ends;
b. a link having two ends, with one end pivotally connected to an end of said counterweight, and with another end pivotally connected to said attaching means;
c. an element having a plurality of ends, with one end pivotally connected to another end of said counterweight, and with another end of said element pivotally connected to said interconnecting linkage moving means, and also with said element pivotally connected to a shaft affixed to said attaching means;
whereby, with the application of acceleration forces to said ejector rack, a sum of moments of said counterbalance assembly and of said interconnecting linkage moving means taken about said shaft is zero.

6. An ejector rack, as set forth in claim 5, wherein said element having a plurality of ends is a bellcrank.

* * * * *